United States Patent [19]
Burt et al.

[11] 3,782,562
[45] Jan. 1, 1974

[54] APPARATUS FOR STACKING EMPTY PALLETS

[75] Inventors: Harold S. Burt, Mendota; Vasco O. Carvalho, Skokie, both of Ill.

[73] Assignee: Conveyor Systems, Inc., Morton Grove, Ill.

[22] Filed: July 28, 1972

[21] Appl. No.: 275,913

Related U.S. Application Data
[62] Division of Ser. No. 171,554, Aug. 12, 1971.

[52] U.S. Cl.................. 214/6 M, 214/6 H, 214/6 P, 214/8.5 A, 214/8.5 F
[51] Int. Cl....................... B65g 57/10, B65g 59/02
[58] Field of Search................ 214/6 P, 6 BA, 6 H, 214/6 D, 6 M, 8.5 R, 8.5 A, 8.5 C, 8.5 F

[56] References Cited
UNITED STATES PATENTS
2,774,489  12/1956  Guigas .......................... 214/8.5 A X
3,113,683  12/1963  VonGal, Jr. ...................... 214/8.5 A
3,319,760  5/1967  Sheldon et al. ................ 214/8.5 C X

*Primary Examiner*—Robert J. Spar
*Attorney*—Wallenstein, Spangenberg, Hattis and Strampel

[57] ABSTRACT

Two depalletizing stations, preferably sharing a common empty pallet stacking station and a common inlet conveyor to be rendered operable by the automatic sequential feeding of loaded pallets to the inlets thereof from the common inlet conveyor. Alternatively, one of the depalletizing stations can be shut down when desired. When the depalletizing stations are both operated, article position and/or apparatus condition sensing means and associated control means responsive thereto control the movement of palletized articles from the common inlet conveyor to the conveyors extending from the common inlet conveyor to the depalletizing stations so palletized articles are automatically fed to a depalletizing station free to receive a new loaded pallet. The depalletizing stations most advantageously discharge articles upon respective article-receiving conveyors each of which is capable of discharging articles at either one of the same two discharge points when operating separately. Empty pallets from the depalletizing stations are fed to different sides of a common pallet stacking station which can receive pallets only one at a time from the depalletizing stations.

4 Claims, 13 Drawing Figures

APPARATUS FOR STACKING EMPTY PALLETS

This is a division of application Ser. No. 171,554, filed Aug. 12, 1971.

This invention relates to article handling equipment, and has its most important application in equipment for handling depalletized articles, such as filled boxes stacked in tiers upon pallets which are delivered to a depalletizing station where the tiers of boxes are removed one tier at a time from the pallets by automatic equipment which discharges the tiers of boxes upon an article-receiving conveyor. The depalletizing station may include a support which can be elevated in steps to bring the different tiers of boxes supported on a pallet to the inlet station of the article-receiving conveyor. After all the tiers of boxes are removed from a pallet, the empty pallet is carried to a pallet stacking station where the pallet is dropped upon a stack of empty pallets.

In accordance with one of the features of the present invention, the handling capacity of a depalletizing installation can be greatly increased with a minimum of additional equipment by integrating the control of at least two depalletizing stations sharing a common pallet stacking station preferably positioned immediately therebetween and adapted to receive empty pallets fed to different sides of the inlet end thereof. Control means may be provided to prevent the simultaneous feeding of two empty pallets to the inlet end of the stacking station where the two depalletizing stations can be simultaneously completing a depalletizing operation at the same time.

Another feature of the invention is the provision of stacking apparatus which is designed to deliver a full load of stacked empty pallets to a remote discharge point without requiring a temporary shutdown in the operation of stacking the pallets. To this end, temporary pallet holding means are automatically brought into position so as to hold newly fed empty pallets at the inlet of the stacking station until the main pallet support apparatus returns from the remote discharge point, whereupon the temporary pallet holding means automatically drops its load upon the main pallet support apparatus and then moves out of the path of travel of the pallets.

The above and other advantages and features of the invention will become apparent upon making reference to the specification to follow, the claims and the drawings wherein:

Figures 1, 1A:
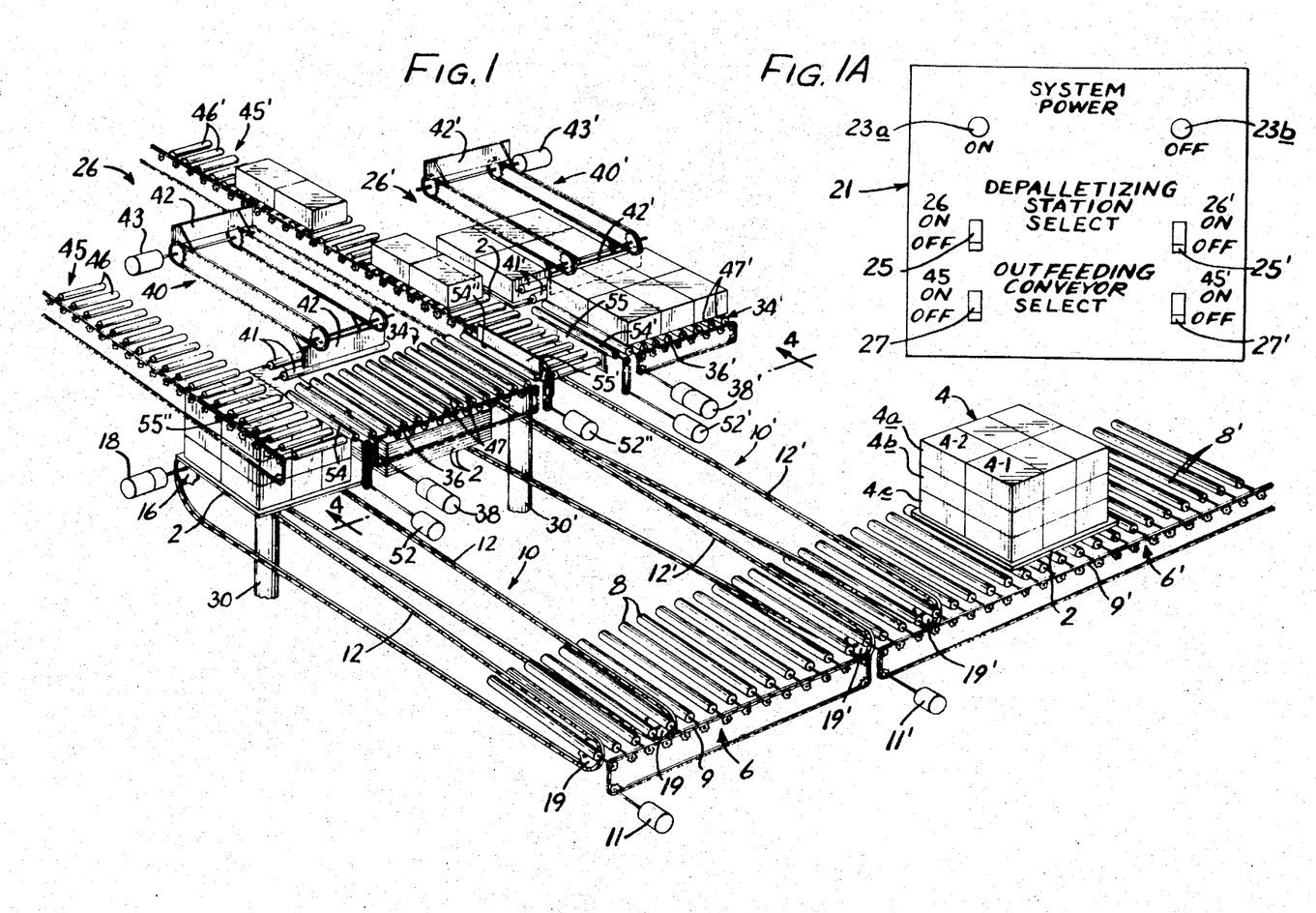
FIG. 1 is a perspective view of a preferred box conveyor and depalletizing system in which palletized articles are delivered from a common inlet conveyor to either one of two depalletizing stations and in which depalletized articles are carried to either one of two possible discharge points at the inlet of a pair of outfeeding conveyors.
FIG. 1A is a view of an exemplary control panel for the box conveyor and depalletizing system of FIG. 1 which provides for a selection of modes of operation of the box conveyor and depalletizing system of FIG. 1.

Referring now more particularly to FIG. 1, the exemplary form of the invention there shown is a conveyor and depalletizing system for pallets 2 carrying a load 4 of articles, such as packed boxes, arranged in tiers 4a, 4b, 4c, etc., one on top of the other. As illustrated, each tier of boxes comprises three longitudinally spaced pairs of boxes 4-1 and 4-2. Each load of boxes on a pallet 2 is delivered on a common inlet conveyor 6 only the end portion of which is shown in FIG. 1. The end portion of the common inlet conveyor as illustrated includes a terminating common inlet conveyor section 6' which may comprise a series of longitudinally spaced rollers 8' driven by suitable driving means, such as chain and sprocket drive means 9' driven by a drive motor 11'. The end of the roller conveyor 6' terminates adjacent the inlet end of a transversely extending infeeding conveyor 10' and an extension conveyor section 6 forming a continuation of the terminating common inlet conveyor section 6' and which may also comprise longitudinally spaced rollers 8 driven by a suitable drive means, such as chain and sprocket drive means 9 driven by a drive motor 11. The end of the terminating common inlet conveyor section 6 is shown terminating at the inlet of a transversely extending infeeding conveyor 10 to be described.

The infeeding conveyors 10 and 10' respectively have frames (not shown) carrying pairs of rear sprockets 16—16 and 16'—16' respectively driven by drive motors 18—18' and pairs of front sprockets 19—19 and 19'—19' around which sprockets extend pairs of chains 12—12 and 12'—12'. The rear sprockets 16—16 and 16'—16' are respectively located adjacent to the inlet ends of depalletizing stations 26'—26'. The front ends of the chains 12—12 and 12'—12' respectively are positioned to pass between or on one side of the rollers 8—8' of the adjacent inlet conveyor sections 6—6' and are normally below the tops of the rollers 8—8' as shown in solid lines in FIG. 3. The front sprockets 19—19 and 19'—19' are shown supported on the ends of a pair of pivotably mounted lever arms like 20 in FIG. 3, which are connected to the control rods of hydraulic cylinders like 22 controlled by valves like 22a operated by solenoids like 51 which when energized fill one end of the associated cylinders with fluid to raise the front sprockets 19—19 and when de-energized cause the fluid to flow therefrom to drop the sprockets 19—19. The raising of the front sprockets bring the inlet ends of the chains 12—12 and 12'—12' slightly above the level of the roller 8—8' of the associated common inlet conveyor sections, to raise any pallet supported on the latter rollers from the inlet conveyor section involved. The upper sections of the raised chains 12—12 and 12'—12' respectively carry the pallets and their loads to the inlet ends of depalletizing stations 26 and 26'.

The operation of the drive motors 11 and 11' driving the inlet conveyor sections 6 and 6' and the drive motors 18 and 18' and solenoids S1 and S1' controlling the infeeding conveyors 10 and 10' as well as other portions of the box conveyor and depalletizing system are controlled by computer and/or manually operated controls in turn feeding signals to logic control circuits like that shown in FIGS. 9A, 9B, 9C and 9D. FIG. 1A shows a control panel 21 for manually controlling the box conveyor and depalletizing system by means of system on-off push button controls 23a and 23b, depalletizing station select on-off controls 25—25' and outfeeding conveyor select on-off controls 27—27'. Push button control 23a is depressed when it is desired to effect operation of the box conveyor and depalletizing system and the push button control 23b is depressed when it is desired to stop operation of the box conveyor and depalletizing system. The depalletizing station select control 25 or 25' is moved to its "on" position when depalletizing stations 26 or 26' and its associated infeeding conveyor 10 or 10' are to be operated by the movement of palletized boxes into a position opposite the same in a manner to be described. If both depalletizing station select controls 25 and 25' are operated to their "on" positions. When only depalletizing station 22' is only operating, the drive motor 11 driving inlet conveyor section 6 is rendered inoperative, then both infeeding conveyors 10 and 10' and the depalletizing stations 26 and 26' are operated when palletized boxes are moved into position opposite the same in a manner to be described.

Figure 2:
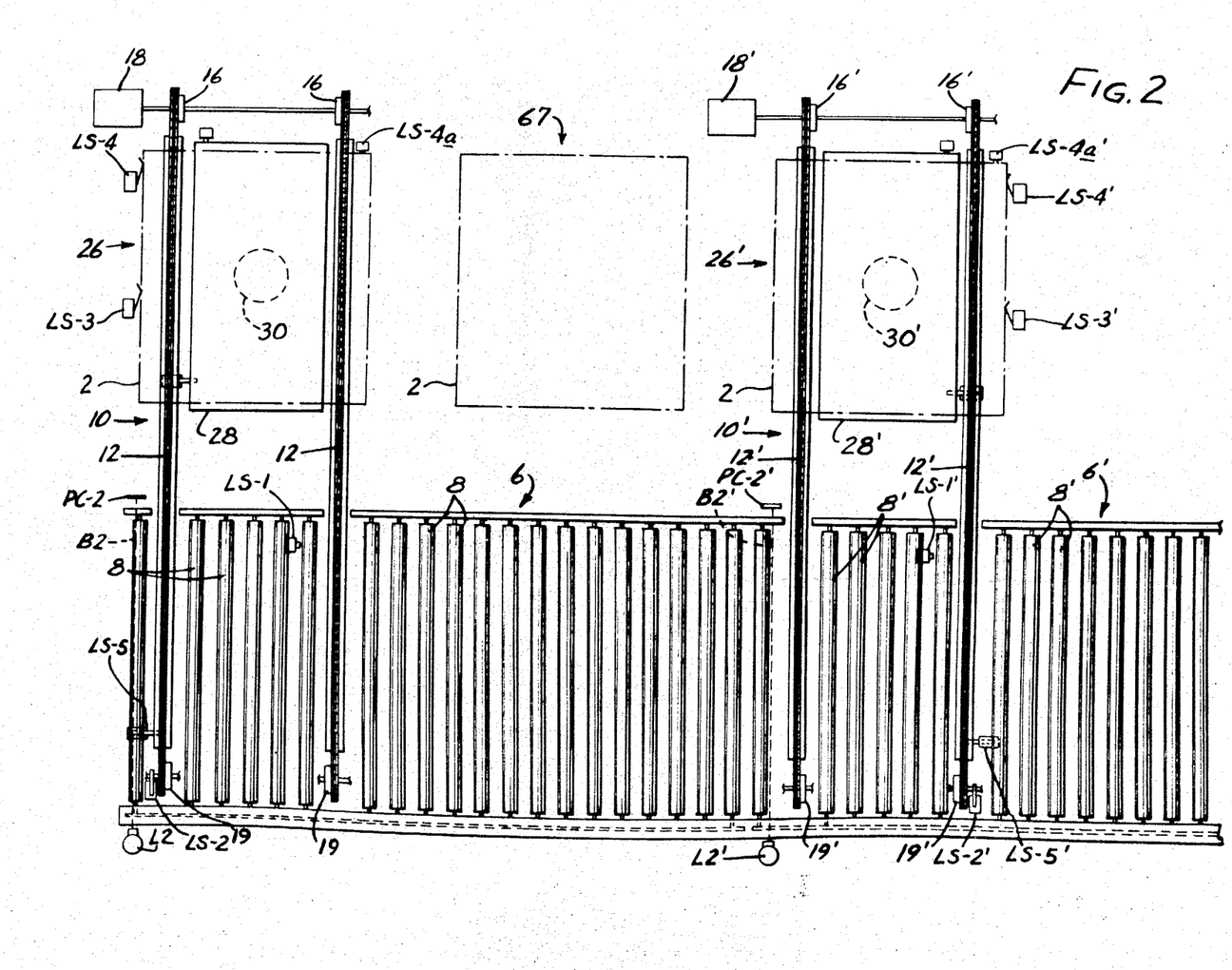
FIG. 2 is a plan view of a portion of the box conveyor and depalletizing system of FIG. 1 including the common inlet conveyor and a pair of transversely extending infeeding conveyors which deliver articles respectively to the inlet sides of the depalletizing stations.

The movement of the rollers 8 and 8' of the conveyor sections 6 and 6', the movement of the chains 12—12 and 12'—12' of the infeeding conveyors 10 and 10', and the raising and lowering of the front ends of the chains 12—12 and 12'—12' are under control of various article position sensing elements to be described. When both depalletizing stations 26 and 26' are to be operative, the conveyor sections 6 and 6' are under control of a logic control circuit like that shown in FIGS. 9A and 9B which will stop the conveyor sections 6 and 6' when both depalletizing stations 26 and 26' are in the process of depalletizing or stacking pallets and pallets are in position at the ends thereof. Also, in such case, the system is designed to deliver a load of palletized boxes first to the infeeding conveyor 10. To avoid interference between successive body in the absence of other load position sensing controls, it will be assumed that successive loads are spaced apart a distance greater than the spacing between the infeeding conveyor 10 and 10'. To this end, conveyor section stopping light sources 12—12' and associated photocell units B2—B2' are placed on opposite sides of the ends of the conveyor sections 6—6' so the beams B2—B2' are intercepted by pallet loads thereat. Also, conveyor section slow down limit switches LS-1' and LS-1 (FIG. 2) having sensing arms extending up between rollers 8' and 8 of conveyor section 6' and 6 at points in advance of the light source L2-L2' to sense the presence of pallet loads approaching positions opposite the associated infeeding conveyors 10' and 10, respectively. In the exemplary form of the invention being described, the depalletizing station 26 is the first station permitted to receive a pallet load, and so, if the depalletizing station 26 opposite the infeeding conveyor 10 is available to receive a pallet load, the photocell unit B2' and limit switch LS-1' opposite infeeding conveyor 10' will be non-responsive to the incoming pallet load so the load can pass on to the end of conveyor section 6. The next pallet load will, however, be effective in stopping the conveyor section 6'. As the first pallet load operates limit switch LS-1, the motor 11 driving the inlet conveyor section 6 slows down to a fraction of its normal speed (like 10 feet per minute instead of 30 feet per minute) and the motor 11 stops when the light beam B2 of light source L2 is intercepted. When depalletizing station 26 is operating and if depalletizing station 26' is free to receive a new pallet load, operation of limit switch LS-1' will operate the motor 11' driving inlet conveyor section 6 at a reduced speed and the interception of beam B2' of light source L2' will stop the motor 11'.

As the slower moving pallet load involved reaches its final position centered above the inlet end of the lowered infeeding conveyor 10 or 10' involved, the interception of light beam B2 or B2' which stops motor 11 or 11' will also effect the energization of the previously mentioned solenoid S1 or S1' controlling the raising of the inlet end of the infeeding conveyor 10 or 10'. The chains 12—12 or 12'—12' of the infeeding conveyors 10 or 10' involved will then lift the pallet load off of the inlet conveyor section 6 or 6'. When the chains 12—12 or 12'—12' are fully raised, a limit switch LS-2 or LS-2' is operated which will effect the energization of the associated drive motor 18 or 18'. When the apllet load reaches the rear end portion of the infeeding conveyor 10 or 10', a limit switch LS-3 or LS-3' is tripped to operate the associated drive motor 18 or 18' at a fraction of its normal speed, such as at the exemplary 10 feet per minute speed referred to previoisly, and to de-energize the solenoid S1 or S1' which riased the front end of the infeeding conveyor, thereby lowering the same. When the pallet load is slightly in advance of its rearwardmost position on the infeeding conveyor 10 or 10', the pallet load is located within the lower inlet end of the depalletizing station 26 or 26' and it trips a limit switch LS-4 or LS-4' which effects the stoppage of the infeeding conveyor drive motor 18 or 18' at a point slightly there beyond because of a slight coasting of the infeeding conveyor.

It should now be apparent that with a conveyor and depalletizing system operating as just described, the common inlet conveyor sections will automatically supply, via the infeeding conveyors, pallet loads to a depalletizing station free to receive a new pallet load.

Figure 4:
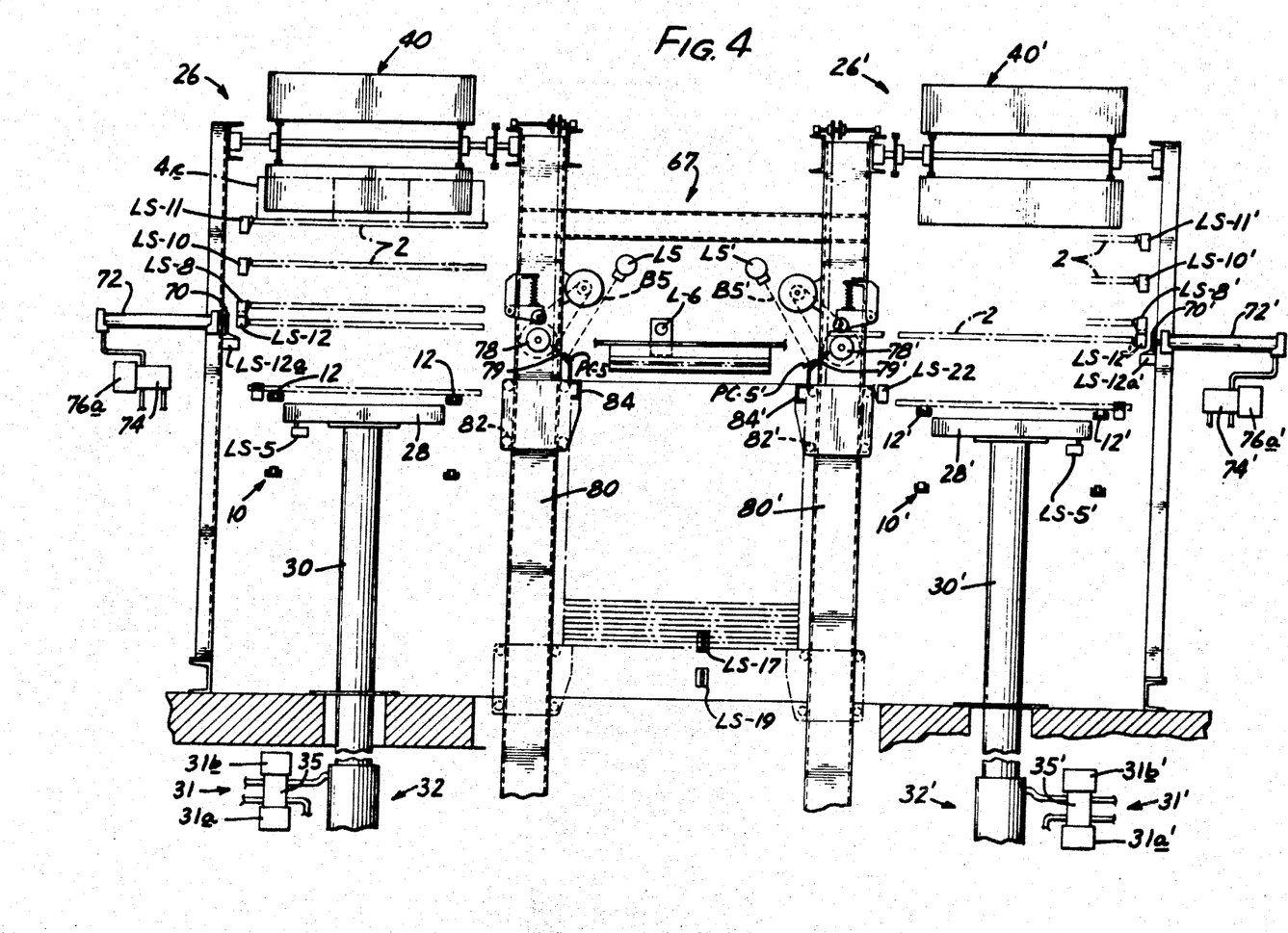
FIG. 4 is a vertical sectional view through a portion of the box conveyor and depalletizing system of FIG. 1, taken along section line 4—4 therein, and showing the manner in which the equipment depalletizes articles and discharges empty pallets to a common pallet stacking station.

As perhaps is best shown in FIG. 4, the depalletizing stations 26—26' preferably include pallet support platforms 28—28'. The chains 12—12 and 12'—12' of the infeeding conveyors 10—10' respectively extend on opposite sides of the associated pallet support platforms 28—28'. Initially, the pallet support platforms 28—28' are positioned at an elevation below the infeeding conveyor chains 12—12 and 12'—12' where limit switches LS-5 and LS-5' are depressed to indicate that the associated depalletizing stations 26 and 26' are free to receive a pallet load. When pallet loads are respectively delivered to the rear ends of infeeding conveyor 10—10' above the support platforms 28—28', the pallet loads trip limit switches LS-4a and LS-4a' to effect raising of the platforms 28—28' to pick the pallet loads off of the associated infeeding conveyors 10—10' to raise the same toward the elevated discharge ends of the depalletizing stations 26-26'. The pallet support platforms 28—28' are shown respectively connected to the upper ends of vertical posts 30 and 30' of hydraulic lift mechanisms generally identified by reference numerals 32—32'. The hydraulic lift mechanisms associated with the depalletizing stations 26—26' may include hydraulic control valves generally indicated by reference numerals 31—31' controlled by pairs of solenoids identified by reference numerals 31a—31b and 31a'—31b'. If neither of the solenoids 31a—31b or 31a'—31b' of valves 31 or 31' are energized, the associated pallet support platform 28 or 28' will be stationary. When solenoid 34a or 34a' is energized, hydraulic fluid is fed into the associated hydraulic cylinder 35 or 35' to cause the associated pallet support platform 28 or 28' to move upwardly. When the solenoid 31b or 31b' is energized, hydraulic fluid is fed to the associated cylinder 35 or 35' to effect the downward movement of the associated pallet support platform 28 or 28'.

In the upward movement of each pallet support platform 28 or 28', the platform is moves successively into three positions where the bottom planes of the different box tiers 4a, 4b and 4c are positioned in the plane of an associated article-receiving conveyor 34 or 34'. In these respective positions, the platforms 28—28' respectively operate limit switches LS-8, LS-10, LS-11 and LS-8', LS-10' and LS-11' which operate when pushed upward by a rising pallet to de-energize the solenoid 34a or 34a' which stops the platforms 28 or 28'. In the most preferred form of the invention, each of the article-receiving conveyors 34 or 34' are roller conveyors driven by chain and sprocket drive mechanisms 36 or 36', in turn, driven by suitable drive motors 38 or 38'.

Figure 3:
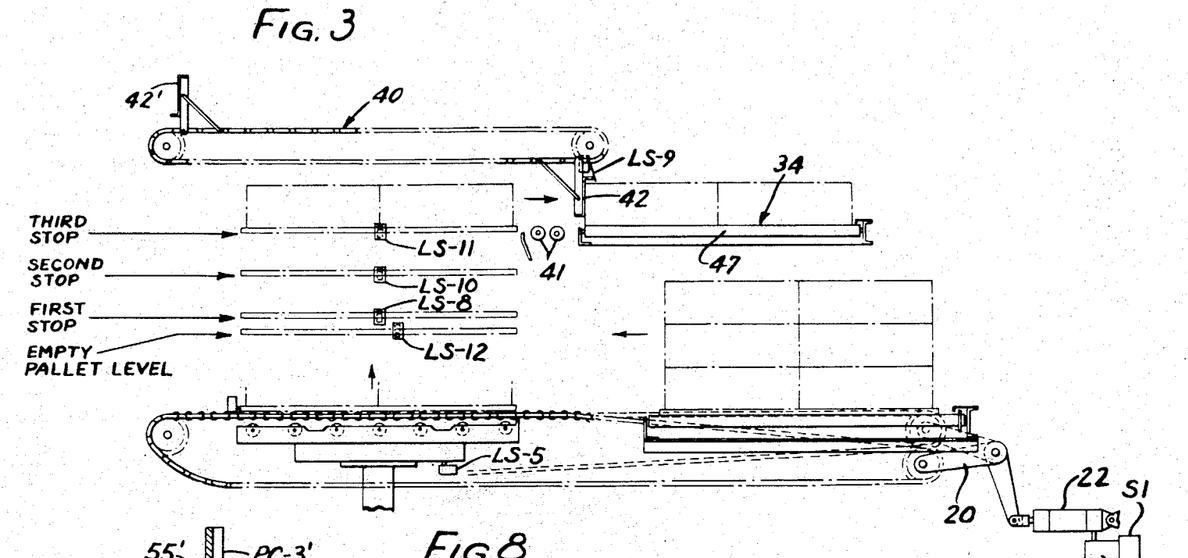
FIG. 3 is an end elevational view of the box conveyor and depalletizing system of FIG. 2, taken along viewing plan 3—3.

Each tier of boxes as illustrated is removed from the associated pallet support platforms 28—28', or the tier of boxes therebelow, by suitable box discharging apparatus 40—40'. FIG. 3 best illustrates the box discharging apparatus 40 of depalletizing station 26, it being understood that box discharging apparatus 40' associated with depalletizing station 26' is identical to apparatus 40 and corresponding parts thereof are similarly numbered except for the addition of a prime (') thereto. Box discharging apparatus 40 is an endless chain conveyor carrying a pair of pusher plates 42—42 extending outwardly from the endless chain conveyor. The conveyor 40 operates through drive motor 43 (FIG. 1). As viewed in FIG. 3, the chain conveyor 40 when operating is moved in a counterclockwise direction so as to bring a pusher plate 42 behind a tier of boxes which are then pushed over idler rollers 41 onto the adjacent article-receiving conveyor. In a manner to be described, as soon as a tier of boxes is pushed upon the associated article-receiving conveyor 34, then the operative pusher plate 42 engages a limit switch LS-9 which de-energizes the associated conveyor drive motor 43 until the tier of boxes involved are cleared at least from the portion of the article-receiving conveyor 34 opposite the discharge end of the conveyor 40.

Figures 5, 7:
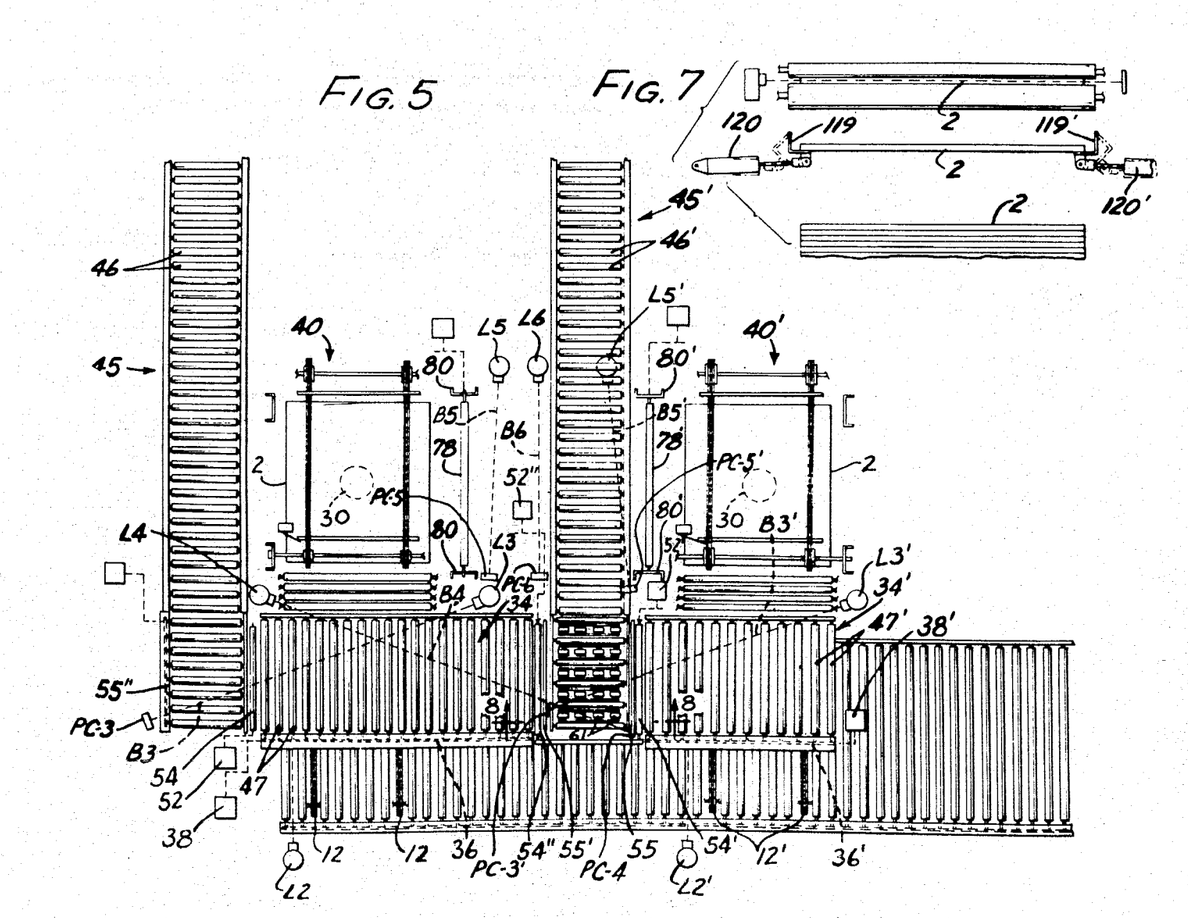
FIG. 5 is a plan view of the box conveyor and depalletizing system of FIG. 1.
FIG. 7 is a simplified vertical fragmentary view of a portion of the stacking apparatus shown in FIG. 6, when the main pallet support apparatus is moved out of position and a temporary pallet holding means is brought into position temporarily to support new pallets fed to the pallet stacking station.
Figure 8:
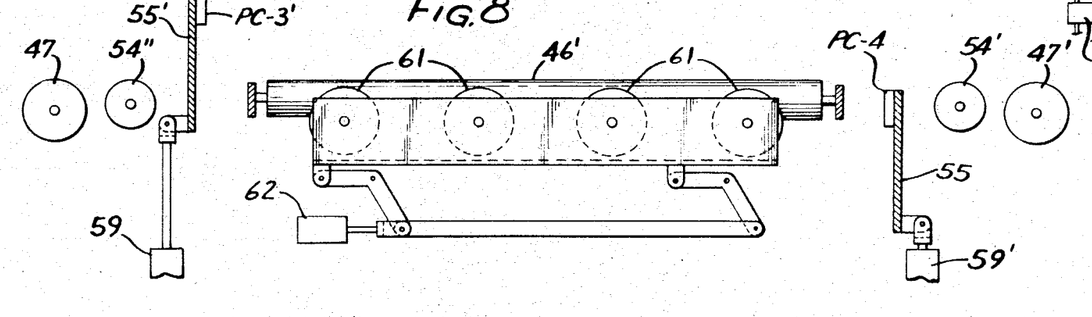
FIG. 8 is a vertical sectional view through the box conveyor and depalletizing system of FIG. 8, taken along section line 8—8 in FIG. 5.

Referring now more particularly to FIGS. 1 and 5, the discharge end of the conveyor 40 (which is the discharge end of the depalletizing station 26) is positioned intermediate the opposite ends of the article-receiving conveyor 34. The pusher plates 42—42 of the conveyor 40 move the articles onto the article-receiving conveyor 34 over idler rollers 41 in a direction parallel to the axes of rotation of the rollers 47 thereof. One end of the article-receiving conveyor 34 is positioned adjacent one side of the inlet end of an outfeeding conveyor 45' extending transversely away from the article-receiving conveyor 34 and the opposite end of the article-receiving conveyor 34 is positioned adjacent one side of the inlet end of an outfeeding conveyor 45. Outfeeding conveyors 45—45' are preferably roller conveyors with rollers 46—46' extending transversely of the rollers 47—47' of article-receiving conveyors 34—34'. When the depalletizing station 26 is operated or when only depalletizing station 26' is operating and delivery of boxes is called for to the outfeeding conveyor 45, the drive motor 38 controlling the movement of the rollers 47 of the article-receiving conveyor 34 is preferably continuously operated at a relatively slow speed and is operable selectively to rotate the rollers 47 in one direction or the other depending on whether delivery of boxes to outfeeding conveyor 45 or 45' is called for. When both of the depalletizing stations 26—26' are operative in the embodiment of the invention shown in the drawing, the article-receiving conveyor 34 id driven in a direction where the boxes delivered thereto are fed to the inlet end of the out-feeding conveyor 45. A relatively high speed separator roller 54 positioned between the end of the article-receiving conveyor 34 adjacent the outfeeding conveyor 45 is driven by a motor 52 at a higher speed then the speed of the rollers 47 of the article-receiving conveyor 34 so that the successive pairs of boxes constituting one of the tiers of boxes just fed upon the conveyor 34 will be separated. A high speed separator roller 54" positioned at the end of the article-receiving conveyo 34 adjacent the outfeeding conveyor 45' is driven by a motor 52" at a higher speed then the speed of the rollers 47 of the article-receiving conveyor 34 so that the successive pairs of boxes constituting one of the tiers of boxes just fed upon the conveyor 34 will be separated when moved upon the outfeeding conveyor 45. The outfeeding conveyors 45 and 45' operate at a much faster speed than the article-receiving conveyors 34 and 34' so that the outfeeding conveyors move each pair of boxes out of the way before the next pair of boxes reach the separator roller involved. An abutment wall 55 positioned between the article-receiving conveyor 34' and the inlet end of the outfeeding conveyor 45' is mounted for up and down movement by a solenoid 59 (FIG. 8) between a bottom position where it is below the level of the outfeeding conveyor 45' and a raised position above the level thereof where the boxes delivered upon the inlet end of the outfeeding conveyor 45' from the article-receiving conveyor 34 will not overshoot the outfeeding conveyor 45'.

The discharge end of the box removing conveyor 40' (which is the discharge end of the depalletizing station 26') is positioned opposite the article-receiving conveyor 34' so as to deliver articles thereupon over the idler rollers 41' in a direction parallel to the axes of rotation of the rollers 47' of the article-receiving conveyor 34'. When the depalletizing station 20' is operating, the rollers 47' are driven by motor 38' in a direction to move articles at a relatively slow speed toward the opposite side of the inlet end of the outfeeding conveyor 45' from the side located adjacent to the article-receiving conveyor 34. An abutment wall 55' positioned between the separator roller 54'' at the latter end of the article-receiving conveyor 34 and the inlet end of the outfeeding conveyor 45' is mounted for up and down movement by a solenoid 59' (FIG. 8) between a bottom position where it is below the level of the outfeeding conveyor 45' and a raised position above the level thereof, as shown in FIG. 1, where the boxes delivered upon the inlet end of the outfeeding conveyor 45' from the article-receiving conveyor 34' will not overshoot the outfeeding conveyor 45'. A box separator roller 54' positioned between the article-receiving conveyor 34' and the inlet end of the outfeeding conveyor 45' is driven by a motor 52' which moves the separator roller 54' at a higher speed then the rollers of the article-receiving conveyor 34' to separate the adjacent pairs of boxes of a tier of boxes fed upon the article-receiving conveyor 34.

When both depalletizing stations 26—26' are in operation, as above indicated, the article-receiving conveyor 34—34' respectively feeds boxes to the inlet ends of the outfeeding conveyors 45—45', and, in such case, the abutment wall 55' is in a raised position and the abutment wall 55 is in a lowered position, as shown in FIG. 1. An abutment wall 55'' is positioned on the outside of the inlet end of the outfeeding conveyor 45 to prevent overshooting of boxes fed upon the end of the outfeeding conveyor 45 by the article-receiving conveyor 34.

As previously indicated, in the mode of operation of the conveyor and depalletizing system where only one of the depalletizing stations 26 or 26' is in operation, the article-receiving conveyor 34 can be operated in one direction or the other by operation of the outfeeding conveyor controls 27 or 27' on the control panel 21 shown in FIG. 1A. When only the depalletizing station 26' is to be operated and it is desired to discharge articles upon the outfeeding conveyor 45, operation of the outfeeding conveyor 27 to its ON position will effect automatically the lowering of abutment walls 55 and 55' and the raising of driven skate rollers 61 (see FIGS. 5 and 8) by solenoid 62 from a position where the skate rollers located between the rollers 46' of outfeeding conveyor 45' are completely below the level of the rollers 47', 46' and 47 of the conveyors 34', 45' and 34, to a position slightly above the same (see FIG. 8), where the skate rollers carry boxes from the inlet end of the article-receiving conveyor 34' to the end of the article-receiving conveyor 34 adjacent the outfeeding conveyor 45', thereby bypassing the outfeeding conveyor 45'. The article-receiving conveyor 34 will then deliver the articles to the inlet end of the outfeeding conveyor 45.

As previously indicated, the pusher plates 42—42 or 42'—42' associated with the box discharging conveyors 40 or 40' instrumental in sweeping tiers of boxes off of the associated pallet support platform 28 or 28' are automatically stopped as a tier of boxes is delivered upon the article-receiving conveyor 34 or 34', and resumes operation only when the boxes are cleared from the article-receiving conveyor 34 or 34' involved. Article position sensing means are provided to sense the presense or absence of boxes in position on the article-receiving conveyor 34 or 34'. Although these sensing means may take a variety of forms, as illustrated in FIG. 5, when the article-receiving conveyor 34 operates in a direction to deliver articles to the outfeeding conveyor 45, a light source L3 is provided directing beam B3 diagonally across the article-receiving conveyor 34 toward the outfeeding conveyor 45. (In the alternative, a reflector may be positioned where the photocell unit PC-3 is located and a photocell unit may be suitably positioned to receive a reflected beam). As long as the light beam B3 is interrupted by a box on the article-receiving conveyor 34 or the inlet end of the outfeeding conveyor 34, the photocell unit PC-3 effects a control operation to terminate movement of the associated box discharging conveyor 40. When, the article-receiving conveyor 34 is operated in a direction to move the articles to the inlet end of the outfeeding conveyor 45', the light source L3 is de-energized and another light source L4 is energized to direct a light beam B4 diagonally across the article-receiving conveyor 34 toward the outfeeding conveyor 45' toward a photocell unit PC-4 (or reflecting surface) mounted on the then raised abutment wall 55. (The photocell unit is thus only moved into position to receive the light beam B4 when the abutment wall 55 is raised into an article box stopping position.) It can thus be seen that when all boxes have been removed from the article-receiving conveyor 34 and the inlet end of the outfeeding conveyor 45 or 45', the box discharging conveyor 40 associated with the outlet end of the depalletizing station 26 resumes movement to sweep another tier of boxes upon the article-receiving conveyor 34.

Similarly, when depalletizing station 26' is in operation, pusher plates 42' of the box discharging conveyor 40' are inhibited from movement as long as boxes remain on the article-receiving conveyor 34'. To this end, light source L3', under the circumstances when the article-receiving conveyor 34' is operative to move articles to the outfeeding conveyors 45', directs light beam B3' and B4 across the article-receiving conveyor 34' toward photocell unit PC-3' on the then raised abutment wall 55'. The light beams B3' is interrupted when a tier of boxes is first moved upon the article-receiving conveyor 34' which interruption remains until the last of these boxes is moved off of the inlet end of the outfeeding conveyor 45'.

Figure 9A:
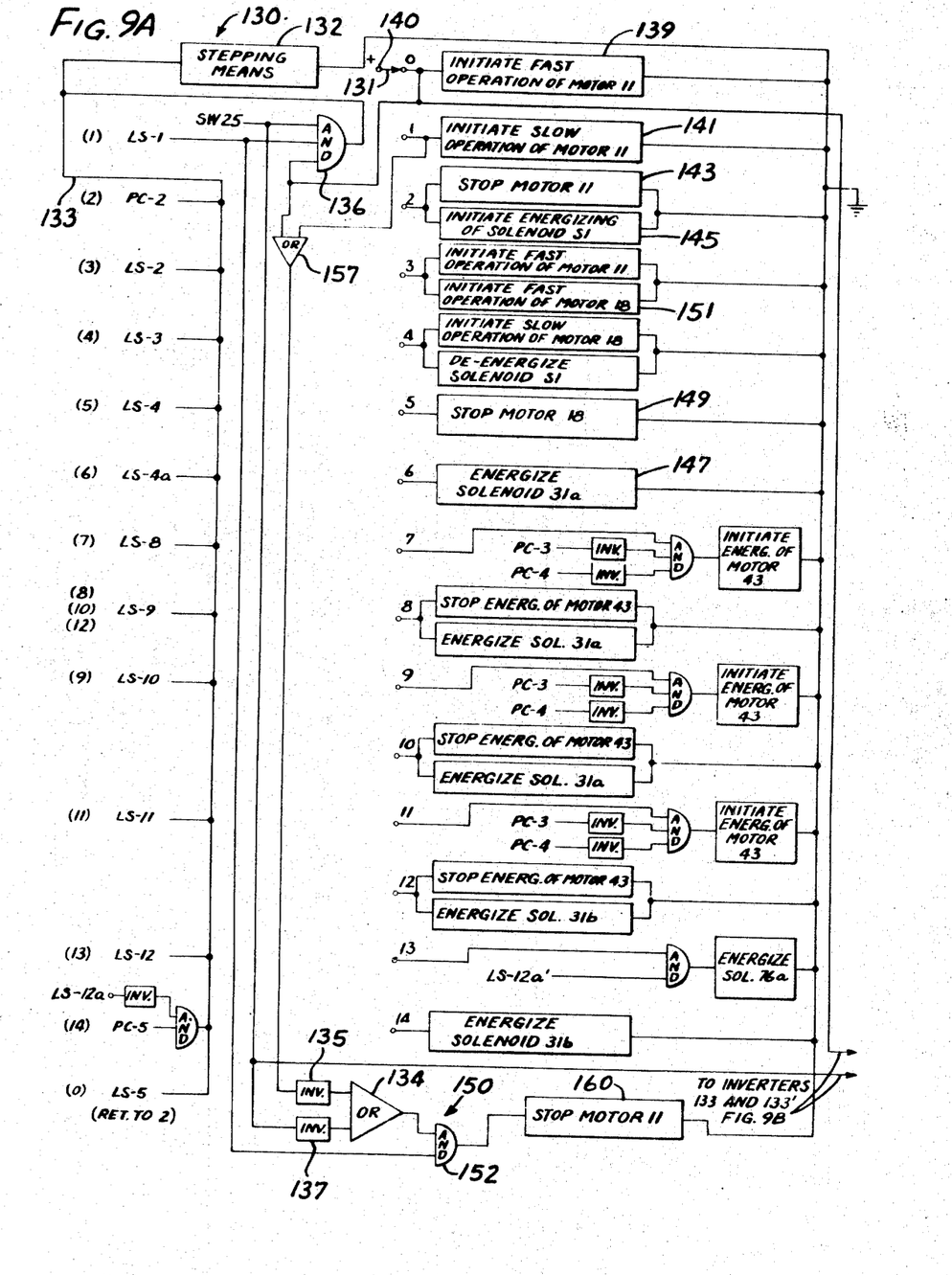
FIG. 9A, 9B, 9C and 9D are logic circuit diagrams of the control means responsive to the various sensing element conditions to control the various motors, solenoids and the like shown in FIGS. 1–8.
Figure 9B:
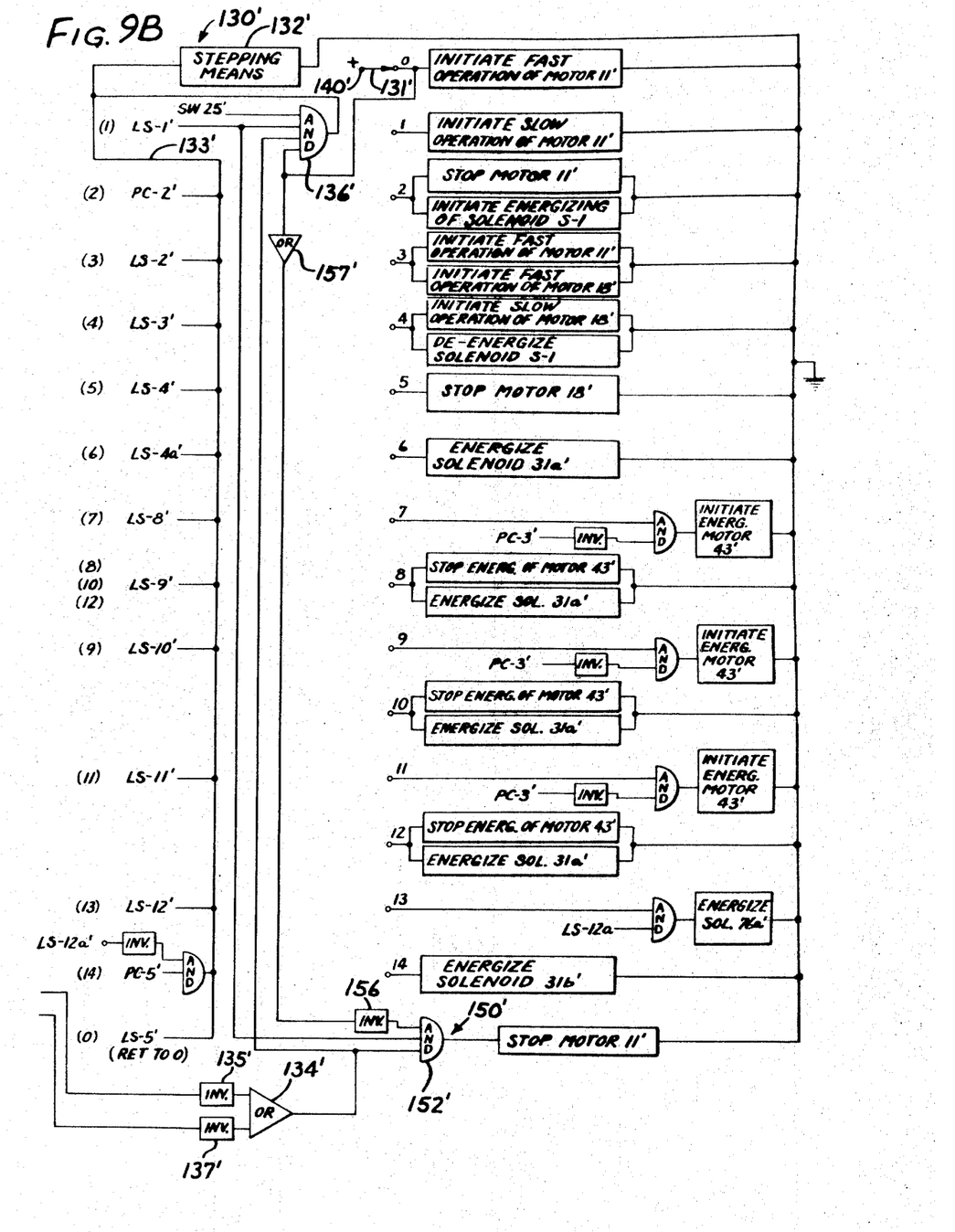

As best shown in FIG. 4, after all of the tiers of boxes have been removed from a pallet 2 supported on a pallet support platform 28 or 28', the platform involved is lowered to an intermediate point where the pallet is opposite the inlet end of a pallet stacking station 67 located immediately between and shared by the two depalletizing stations 26—26'. The control circuit for reversing the direction of the platforms may take a variety of forms. An exemplary logic circuit diagram for such a control circuit will be later described and is shown in FIGS. 9A and 9B. The pallet stacking station 67 receives pallets from the opposite sides of the inlet end thereof delivered thereto from the pallet support platforms 28—28'. An empty pallet delivered to the inlet end of the pallet stacking station 67 is pushed from the pallet support platforms 28 or 28' by pusher member 70 or 70' shown secured to the end of an operating rod of a hydraulic cylinder 72 or 72' operated by control valve 74 or 74'. The control valves 74—74' include solenoids 76a—76a' which, when energized, effect the extension of the associated pusher members 70—70' respectively to push the pallet involved to continuously driven pallet feeding rollers 78—78', and when de-energized, effect the retraction of the associated pusher members 70—70'

Figure 6:
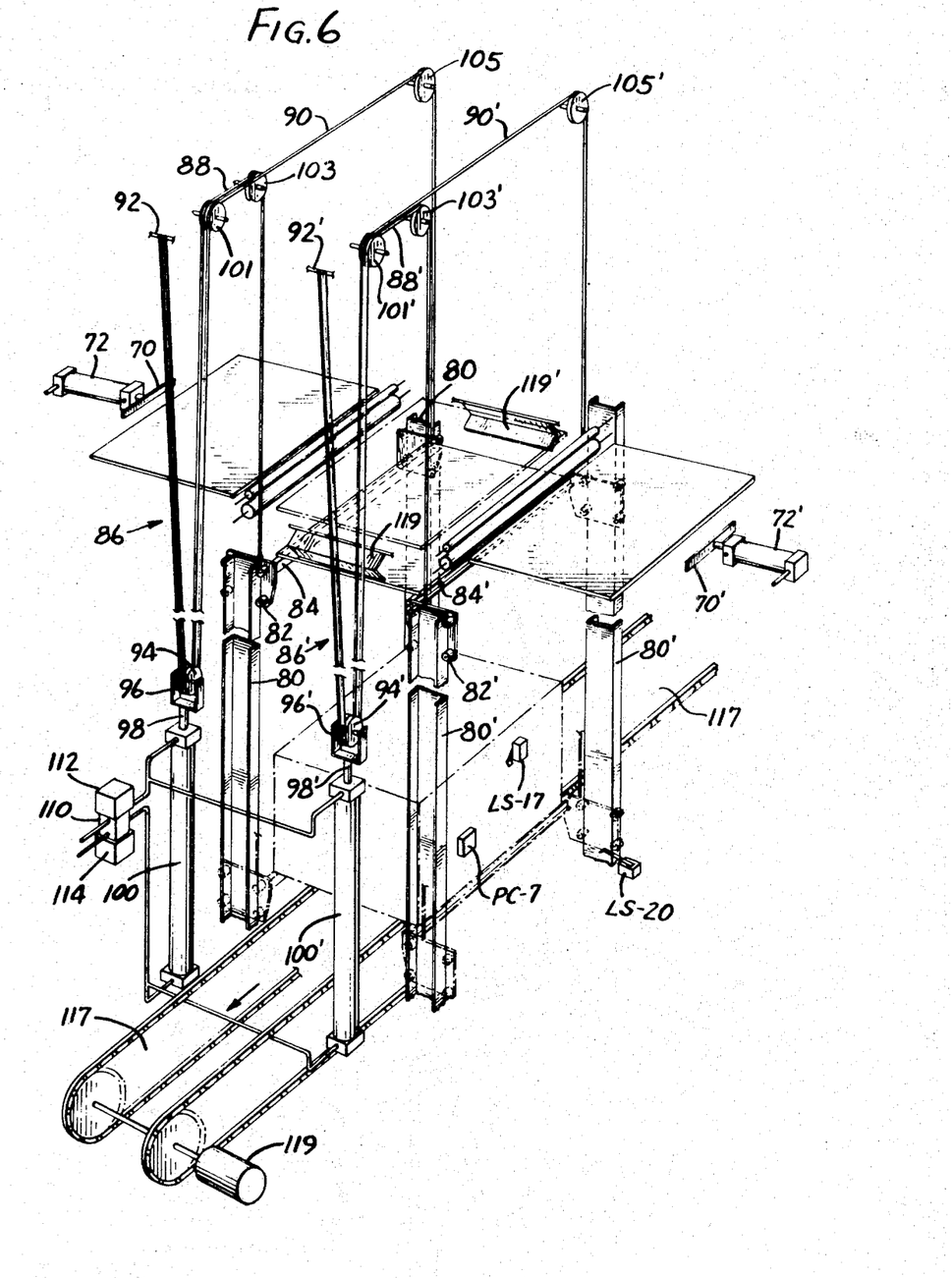
FIG. 6 is a perspective view of the common pallet stacking station used in the box conveyor and depalletizing system of FIG. 1, with the main pallet support apparatus shown in solid lines in a normal position to receive pallets, and in dashed lines in a pallet discharging position.

The pallet stacking apparatus includes adjacent each of the depalletizing stations 26—26' pairs of laterally spaced columns 80—80 and 80'—80' between which are mounted for up and down movement, as by rollers 82—82', pallet support members 84—84'. As best shown in FIG. 6, the elevation of the pallet support members 84—84' are controlled by hydraulically operated pulley assemblies 86—86'. The pulley assemblies 86—86' respectively include a pair of cables 88-90 and 88'-90' having one of their ends suitably anchored to stationary points 92—92'. Cables 88-90 and 88'-90' pass around suitable pulleys 94—94' carried by brackets 96-96' secured to the operating rods 98—98' of hydraulic cylinders 100—100'. Cables 88-90 and 88'-90' pass around the bottom of the pulleys 94—94' and then extend upwardly around guide pulleys 101—101'. Cables 88—88' then pass around pulleys 103—103' where they are secured to the associated pallet stacking members 84—84'. Cables 90—90' extends across to the other side of the pallet stacking apparatus where they pass around pulleys 105—105' where they extend downwardly to make engagement with the associated pallet stacking member 84—84'.

As the operating rods 98—98' of the cylinders 100—100' rise from their positions shown in FIG. 6, the pallet stacking members 84—84' are lowered on the columns 80—80 and 80'—80'. The cylinders 100—100' are respectively controlled by solenoid controlled valve control apparatus 110. The valve 110 has a solenoid 112 which, when energized, result in the retraction of the operating rods 98—98', and a solenoid 114 which, when energized, effect the upward extension of the operating rods 98—98'.

Normally, the pallet support members 84—84' are at an elevation substantially contiguous to but spaced below the point at which pallets are moved into the pallet stacking station by the rollers 78—78'.

The movement of a pallet into the pallet stacking station from pallet support platform 28 will momentarily break the beam B5 of a light source L5 directed to a photocell unit PC-5, and the movement of a pallet into the pallet stacking station from pallet support platform 28' will momentarily break the beam B5' of a light source L5' directed to a photocell unit PC-5'. When the pallet drops fully into the pallet stacking station, its previously interrupted beam is re-established and this de-energizes the associated pusher member operating solenoid which retracts the pusher member involved. The simultaneous feeding of two pallets into the stacking station is prevented by an interlock control of any kind, such as limit switches L12a-L12a' which are operated when the respective pusher members 70—70' leave their fully retracted positions. The limit switches L12a-L12a' are respectively in the control circuits of the respective solenoids 76a—76a', so each pusher member cannot be extended unless the other pusher member is fully retracted.

A pallet is guided by guide plates 79—79' into position where it drops a relatively short distance upon the pallet support members 84—84'. When approximately six pallets have been stacked upon the pallet support members 84—84' suitable control apparatus are operated, such as a delay operating photocell unit PC-6 (FIG. 5) mounted to receive a light beam B6 of a light source L6. The momentary interruption of the light beam B6 will have no effect, but a prolonged interruption caused by the sixth and subsequent pallets will effect energization of solenoid 114 as long as the beam is interrupted to cause the lowering of the pallet stacking members 84—84' a distance equal to the thickness of one pallet, to permit a clearance space for another pallet to be fed onto the stack of pallets at the pallet stacking station.

When a full load of pallets have been stacked upon the pallet stacking members 84—84', control apparatus, such as limit switch LS-17 (FIG. 4), is operated by the downward movement of the bottommost pallet in the stack to effect the high speed movement of the pallet support members to a bottommost position where the pallets are delivered upon a pallet discharge conveyor 117 (FIG. 6) operated by a drive motor 117. During the initial high speed downward movement of the pallets, a limit switch LS-19 (FIG. 4) or the like is operated. When the pallet support members have lowered the stack of pallets upon the conveyor 117, a light beam directed to a photocell unit PC-7 is interrupted, a limit switch LS-20 (FIG. 6) is operated which de-energizes solenoid 114 to stop the downward movement of the pallet support members, operate drive motor 117 for a period to deliver the pallets to a remote point when the light beam directed to photocell unit PC-7 is reestablished to effect the reverse or upward movement of the pallet support members by energization of the solenoid 112.

During the initial high speed downward movement of the pallet support members which operated limit switch LS-19, temporary pallet holding means are brought into position to receive temporarily other pallets delivered to the pallet stacking station. The temporary pallet holding means, as shown in FIGS. 6 and 7, may comprise a pair of shoulder-forming members 119—119' pivotably mounted for movement by control solenoids 120—120' energized by operation of a limit switch LS-19 by the bottom pallet in the stack. The shoulder-forming members 119—119' are mounted for movement between normal inoperative positions where they are out of the path of travel of pallets moved into the pallet stacking station to operative positions where they form support shoulders for supporting pallets delivered to the pallet stacking station, as best shown by the solid line positions of these temporary pallet holding means in FIG. 7. As soon as the pallet support members 84—84' are returned to their normal initial elevation, control means like limit switch LS-22 is operated to effect de-energization of solenoids 120—120' to move temporary pallet holding means 119—119' out of the way of incoming pallets and de-energization of solenoid 112 to stop the upward movement of the pallet support members.

FIGS. 9A, 9B, 9C and 9D are exemplary logic circuit diagrams of exemplary means for controlling the various motors and solenoids in response to the operation of the various switches and photocell units previously described. It should be understood that numerous other arrangements of switches, photocell units and logic circuit elements could be provided to accomplish the unique mode of operation of the invention described and claimed without deviating from the broader aspects of the invention.

The exemplary logic circuits of FIGS. 9A and 9B respectively control the feeding of palletized articles to, and the operation of, the depalletizing stations 26 and 26' by means like stepping switches or shift registers (stepping switches 130—130' being illustrated) by the movement of the palletized articles past the various switches and photocell units previously described. (Thus, while stepping switches are illustrated, it is understood that shift registers or the like could be substituted for the stepping switches shown in the exemplary form of the invention being described.) Each of the stepping switches 130 and 130' as shown include fifteen active stationary contacts numbered 0 through 14 which are rendered sequentially operative to energize various control elements which may be solenoids and/or relays connected to or associated with the various stepping switch contacts. The advancement of the stepping switches is controlled by the feeding of pulses or voltage charges to stepping means 132 and 132'. The stepping switches have movable contacts like 131 or 131' which successively make contact with the No. 0 through No. 14 contacts under control of the voltage charges or pulses fed to the stepping means 132 or 132'. Stepping means 132 and 132' receive pulses or voltages which effect a stepping operation respectively from common input lines 133 and 133' or the outputs of "AND" gates 136 and 136'. It will be assumed that a change to a constant voltage of a given polarity or a voltage pulse of a given polarity, such as positive, is necessary to effect a stepping operation. Also, all the limit switches will be assumed to be normally open switches which are closed when operated for the various circumstances previously described to provide a positive voltage output. Similarly, it will be assumed that the various photocell units produce a positive voltage output only when the light beam directed thereto is interrupted. The various "OR" circuits and "AND" gates indicated throughout the logic circuit diagram operate in accordance with well-known principals for these types of logic circuit elements. That is, for an "AND" gate all inputs must have the proper operating polarity (positive in the exemplary form of the invention) to produce an operating output voltage which is further assumed to be of the exemplary positive polarity. Also, "OR" circuits produce a positive operating output only when any one of its inputs is a positive voltage. Inverter circuits identified by " INV" will be assumed to product a positive output only when its input is non-positive. Moreover, the outputs from the various limit switches and photocell units are shown identified by reference numerals 1–14 and 0 to indicate that positive voltage outputs thereof are to respectively effect operation of the associated stopping switch movable contact 131 or 131' to the correspondingly numbered stationary contacts of the stepping switch involved.

The common input lines 133 and 133' are respectively connected to control elements PC-2, PC-2', LS-2, LS-2', LS-3, LS-3', LS-4, LS-4', LS-4a, LS-4a', LS-8, LS-8', LS-9, LS-9', LS-10, LS-10', LS-11, LS-11', LS-12, LS-12', PC-5, PC-5', LS-12a, LS-12a' and LS-5 and LS-5'. The inputs of the "AND" gates 136 and 136' are the select switches 25 and 25' limit switches LS-1 and LS-1' and the output of the No. 1 contacts of the stepping switches 130 and 130'. The "AND" gate 136' has an input from an "OR" circuit 134'. The outputs of the "AND" gates 136 and 136' are respectively connected to inputs of the stepping means 132 and 132'. When the movable contact 131 of stepping switch 130 is on the No. 0 contact, the stepping switch 130 cannot step unless a pallet reaches limit switch LS-1, and depalletizing station select switch 25 is in its "ON" position. (Manually operable means not shown may be provided to move contacts 131 and 131' to any initial desired contact position.) To advance the movable contact 131' of stepping switch 130' from the No. 0 contact position, in addition to the "ON" or operated state of select switch 25' and limit switch LS-1', a signal from "OR" gate 134' must be fed to "AND" gate 136' which occurs only when depalletizing station 26 is rendered inoperative by the "OFF" state of select switch 25 or when depalletizing station 26 is in operation as indicated by the movable stepping switch contact 131' being on a contact other than the No. 0 contact of stepping switch 130'. To this end, the select switch 25 and the No. 0 contact of stepping switch 130 are connected to inverters 135' and 137' whose outputs are connected to the "OR" circuit 134'.

FIGS. 9A and 9B (as well as FIGS. 9C and 9D) show boxes or other circuit elements connected with the various stationary stepping switch contacts. The boxes are identified in accordance with the particular functions to be carried out by the components represented thereby. Thus, for example, the various boxes may be relays or the like with contacts performing the functions indicated thereon and so the box 139 in FIG. 9A connected to the No. 0 stepping switch contact of stepping switch 130 and entitled "Initiate Fast Operation of Motor 11" is energized when the movable contact 131 connected to positive voltage terminal 140 engages the No. 0 contact. The function "Initiate" whereever used in a box indicates that the box is a relay or the like which effects the function involved even when the movable contact like 131 leaves the associated contact until a "stop" operation is called for. Thus, the box 139 may be a relay which locks into an energized state through a holding circuit (not shown) containing holding contacts of the relay or a relay with contacts energizing another relay which locks in through its own contacts to energize the control circuit of motor 11 to operate the same at a relatively fast speed.

The box 141 associated with the No. 1 stepping switch contact of stepping switch 130 and entitled "Initiate Slow Operationof Motor 11" similarly represent a relay having contacts which effects the locked-in energization itself of another relay whose contacts effect the continuous feed of a voltage to the input of the control circuit of motor 11 which operates the motor at a relatively slow speed and breaks the holding circuit of the locked-in relay which previously energized the input of the motor control circuit which operated the motor at a high speed. There is shown connected to the No. 2 stepping switch contact control components 143 and 145 respectively as carrying out the functions of initiating the locked-in fast operation of motor 11 and initiating the locked-in energization of infeeding conveyor raising solenoid S1 in a manner like that just described.

When the word "Initiate" is absent in describing the function of a given component, this means that the component involved is energized only during the time the particular stationary stepping switch contact is energized and so no holding circuits are associated with the relays or the like to be energized. Thus, for example, box 147 associated with the No. 6 stepping switch contact of stepping switch 130 performs the function of energizing solenoid 31a only so long as the movable contact 131 remains on the stationary contact involved. This function can be performed by a relay with contacts connected between a voltage source and the solenoid 31a.

Associated with the No. 5 stepping switch contact of the stepping switch 130 is a component 149 which carries out the function "stop motor 18." This component 149 may be a relay with normally closed contacts in the holding circuit of a relay which effects the slow operation of motor 18 and was previously locked-in an energized state when the No. 3 contact of the stepping switch was energized by the engagement thereof by the movable contact 131. Thus, energization of the No. 5 stepping switch contact would, in the exemplary relay circuit, result in the opening of the normally closed relay contacts referred to in the holding circuit of the locked-in relay to de-energize the same until the same is subsequently energized by a subsequent closure of a relay contact effected by another operation of the stepping switch. Other "stop" functions indicated in the logic circuit diagram may be effected in this manner.

Since it is obvious to anyone skilled in the art of electrical control circuit design to design a particular relay circuit to carry out the functions indicated in the logic circuit diagrams of FIGS. 9A, 9B, 9C and 9D, such specific circuit diagrams have been omitted to avoid cluttering this specification with unnecessary details.

The manner in which the remainder of the circuits associated with the stepping switches 130 and 130' are self-evident from the drawings in the light of the explanation of the meaning of the symbols and expressions above described.

The logic circuit diagrams of FIGS. 9A and 9B include, in addition to the stepping switch circuits introduced above, logic circuit sections 150 and 150' which effect the stopping of the motors 11 and 11' controlling the inlet conveyor sections during various previously described circumstances other then the one effected by the movement of the movable stepping switch contacts to the No. 2 stationary contacts. For example, a logic circuit section 150 is provided (FIG. 9A) which is effective in stopping the motor 11 controlling the extension inlet conveyor section 6 when at a given moment an article reaches the first limit switch LS-1 and the select switch 25 is in its OFF position (i.e., when the depalletizing station 26 is to be inoperative) or when a palletized article is in the process of being fed by the infeeding conveyor 10 to palletizing station 26 or the depalletizing station 26 is in operation (as indicated by the movable contact 131 being on the stationary contacts other than the No. 0 and No. 1 contacts of stepping switch 130). A logic circuit section 150' is provided (FIG. 9B) which is effective in stopping the motor 11' when at a given moment an article reaches the limit switch LS-1' when a palletized article in in the process of being fed by the infeeding conveyor 10' to palletizing station 26' or the depalletizing station 26' is in operation (as indicated by the movable contact 131' being on the stationary contacts other than No. 0 and No. 1 contacts of stepping switch 130'), and a positive output is present in the aforesaid "OR" circuit 134' (which occurs when either depalletizing station 26 is busy or inoperative).

The aforesaid functions may be carried out by means including an "AND" gate 152 in logic circuit section 150 (FIG. 9A) which has one input connected to the limit switch contacts LS-1 to receive a positive voltage when the same is operated, and an input connected to the output of an "OR" circuit 134. The "OR" circuit 134 has one input connected through an inverter 135 to the output of an "OR" circuit 157 whose two inputs are respectively connected to the No. 0 and No. 1 contacts of the stepping switch 130, and an input connected through an inverter 137 to the select switch 25. The output of "AND" gate 152 is connected to a control device 160 which effects the stopping of the motor 11 and thus may be a relay having contacts in the holding circuits of the fast and slow operating inputs to the control circuit on the motor 11.

The logic circuit section 150' (FIG. 9B) has an "AND" gate 152' with one input connected to the output of the limit switch LS-1', another input connected through an inverter 156 to the output of an "OR" circuit 157' whose two inputs are respectively connected to the No. 0 and No. 1 contacts of the stepping switch 130', and an input extending from the output of the aforesaid "OR" circuit 134'.

Figure 9C:
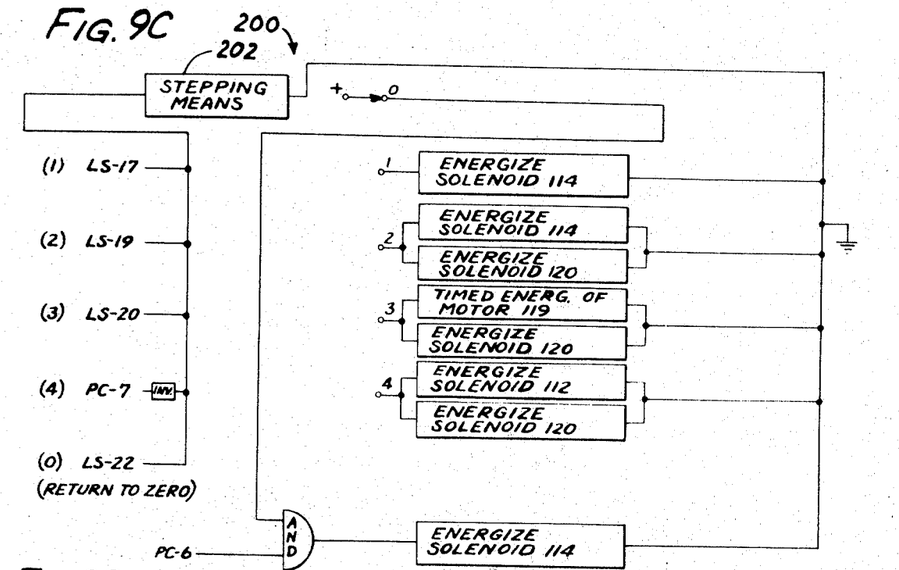

FIG. 9C shows the logic circuit diagram which effects movement of the pallet support members 84—84' in the manner previously described. This logic circuit diagram includes a stepping switch 200 or the like with only five active stationary contacts No. 0-4 and stepping means 202 which receives stepping pulses from the various limit switches and photocell units indicated.

Figure 9D:
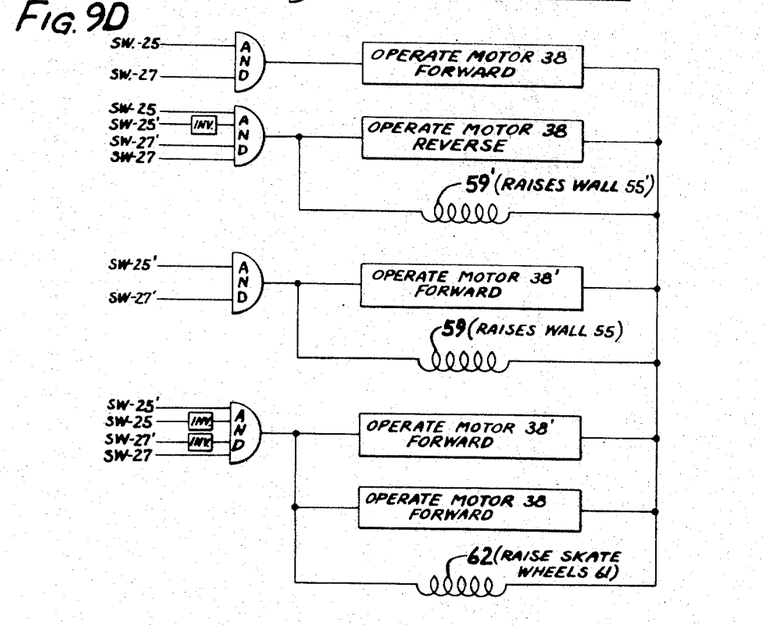

FIG. 9D shows the logic circuit diagram which responds to the various control switches on the panel 21 shown in FIG. 1A which operates the motors 38 and 38' forward or backward controlling the article-receiving conveyors 34 and 34' and the solenoids 59, 59' and 62 which effect the raising and lowering of the abutment walls 55 and 55' and skate wheels 61.

It is thus apparent that the present invention has effected a highly efficient and flexible integration of conveyors, depalletizing stations and a common pallet stacking station which represents a substantial improvement in the art of handling and depalletizing palletized articles.

It should be understood that numerous modifications may be made in the present form of the invention without deviating from the broader aspects of the same.

We claim:

1. In a depalletizing system comprising a first and a second pallet support means each for carrying a separate pallet carrying tiers of boxes or the like to be removed one tier at a time therefrom, first and second box-receiving conveyor means having inlet stations for respectively receiving said tiers of boxes supported on said first and second support means, support control means for respectively elevating said first and second pallet support means in steps to bring the different tiers of boxes sequentially to the elevation of said inlet stations of said first and second box-receiving conveyor means, first and second pusher means for respectively sequentially pushing the different tiers of boxes on said first and second pallet support means onto said first and second box-receiving conveyor means, first and second box pusher control means respectively responsive to the raising of a tier of boxes by said first and second support means to the elevation of said box-receiving conveyor means and to the clearance of other boxes from the portion of said box-receiving conveyor means adjacent to said pallet support means by operating said pusher means by pushing a new tier of boxes onto the associated box-receiving conveyor means, the improvement comprising a common pallet stacking means for stacking empty pallets from both of said support means, said common pallet stacking means having separate inlet stations at which pallets may be delivered from said first and second pallet support means, said first and second support control means including respective means following the pushing of the last tier of boxes from the associated pallet support means for moving the same to the associated inlet stations of said common pallet stacking means, first and second pallet discharge means for moving empty pallets respectively from said first and second pallet support means onto said pallet stacking means, and means for preventing the movement of a pallet into said common pallet stacking means from one of said pallet support means while a pallet is being moved onto the common pallet stacking means from the other pallet support means.

2. In a depalletizing system comprising a first and a second pallet support means each for carrying a separate pallet carrying tiers of boxes or the like to be removed one tier at a time therefrom, first and second box-receiving conveyors having inlet stations for respectively receiving said tiers of boxes supported on said first and second support means, support control means for respectively elevating said first and second pallet support means in steps to bring the different tiers of boxes sequentially to the elevation of said inlet stations of said first and second box-receiving conveyor means, first and second pusher means for respectively sequentially pushing the different tiers of boxes on said first and second pallet support means onto said first and second box-receiving conveyor means, first and second box pusher control means respectively responsive to the raising of a tier of boxes by said first and second support means to the elevation of said box-receiving conveyor means and to the clearance of other boxes from the portion of said box-receiving conveyor means adjacent to said pallet support means by operating said pusher means by pushing a new tier of boxes onto the associated box-receiving conveyor means, the improvement comprising a common pallet stacking means for stacking empty pallets from both of said support means, said common pallet stacking means being below said inlet stations of said first and second box-receiving conveyor means and having separate inlet stations respectively to face said first and second pallet support means at an elevation below that of the inlet stations of said first and second box-receiving conveyor means, the common pallet stacking means including vertically movable base means initially at an upper elevation adjacent said inlet stations where the empty pallets are to be fed thereto from said first and second pallet support means and as each pallet is fed to the common pallet stacking means lowers said movable base means small incremented amounts to permit another pallet to be fed from either of said pallet support means upon the top of the last pallet fed thereto, said first and second support control means including respective means following the pushing of the last tier of boxes from the associated pallet support means for moving the same to the associated inlet stations of said common pallet stacking means, and first and second pallet discharge means for moving empty pallet respectively from said first and second pallet support means onto said base means of said pallet stacking means.

3. The depalletizing system of claim 2 wherein there is provided means for preventing the movement of a pallet into said common pallet stacking means from one of said pallet support means while a pallet is being moved into the common pallet stacking means from the other pallet support means.

4. The depalletizing system of claim 2 wherein there is provided means responsive to the lowering of said base means to an elevation indicating the presence of a full stack of pallets for moving the base means to a pallet stack discharge location where pallets are removed therefrom and then returning the same to said point adjacent said inlet stations of said pallet stacking means, and means for temporarily moving shelf means a short distance below said inlet stations of said pallet stacking means while said base means is moved to and from said pallet stack discharge location to catch pallets fed thereto and for dropping the pallets upon said base means when moved into position adjacent said inlet stations.

* * * * *